(12) United States Patent
Amosov et al.

(10) Patent No.: US 10,077,208 B2
(45) Date of Patent: Sep. 18, 2018

(54) GLASS ARTICLE AND METHOD FOR FORMING THE SAME

(71) Applicant: Corning Incorporated, Corning, NY (US)

(72) Inventors: Alexey Sergeyevich Amosov, Gatchina (RU); Heather Debra Boek, Corning, NY (US); Frank Coppola, Horseheads, NY (US); Matthew John Dejneka, Corning, NY (US); John Christopher Mauro, Corning, NY (US); Natesan Venkataraman, Painted Post, NY (US); Mark Owen Weller, Painted Post, NY (US)

(73) Assignee: CORNING INCORPORATED, Corning, NY (US)

( * ) Notice: Subject to any disclaimer, the term of this patent is extended or adjusted under 35 U.S.C. 154(b) by 74 days.

(21) Appl. No.: 15/125,453

(22) PCT Filed: Mar. 12, 2015

(86) PCT No.: PCT/US2015/020059
§ 371 (c)(1),
(2) Date: Sep. 12, 2016

(87) PCT Pub. No.: WO2015/138660
PCT Pub. Date: Sep. 17, 2015

(65) Prior Publication Data
US 2017/0073266 A1     Mar. 16, 2017

Related U.S. Application Data

(60) Provisional application No. 61/989,717, filed on May 7, 2014, provisional application No. 61/952,580, filed on Mar. 13, 2014.

(51) Int. Cl.
C03B 17/06     (2006.01)
C03C 17/02     (2006.01)
(Continued)

(52) U.S. Cl.
CPC .............. *C03C 17/02* (2013.01); *B32B 17/06* (2013.01); *C03B 17/02* (2013.01); *C03B 17/064* (2013.01);
(Continued)

(58) Field of Classification Search
None
See application file for complete search history.

(56) References Cited

U.S. PATENT DOCUMENTS 3,737,294 A   6/1973   Dumbaugh, Jr.
3,746,526 A   7/1973   Giffon
(Continued)

FOREIGN PATENT DOCUMENTS

JP   60033221 A   2/1985
JP   2012193067 A   10/2012
(Continued)

OTHER PUBLICATIONS

Notification of Transmittal of The International Search Report and Written Opinion of the International Searching Authority, or the Declaration, dated Jun. 18, 2015, pp. 1-13, International Application No. PCT/US2015/020059, European Patent Office, The Netherlands.
(Continued)

*Primary Examiner* — Lisa L Herring

(57) ABSTRACT

A method includes forming a glass article. The glass article includes a core and a clad adjacent to the core. The core includes a first glass composition. The clad includes a second glass composition different than the first glass composition. A degradation rate of the second glass composition in a reagent is greater than a degradation rate of the first glass composition in the reagent.

15 Claims, 10 Drawing Sheets

(51) Int. Cl.
*B32B 17/06* (2006.01)
*C03C 15/02* (2006.01)
*C03C 3/083* (2006.01)
*C03C 3/087* (2006.01)
*C03C 3/091* (2006.01)
*C03C 3/093* (2006.01)
*C03C 3/097* (2006.01)
*C03B 17/02* (2006.01)
*C03C 21/00* (2006.01)

(52) U.S. Cl.
CPC .............. *C03C 3/087* (2013.01); *C03C 3/091* (2013.01); *C03C 3/093* (2013.01); *C03C 3/097* (2013.01); *C03C 15/02* (2013.01); *C03C 21/002* (2013.01); *C03C 2218/355* (2013.01); *Y02P 40/57* (2015.11)

(56) References Cited

U.S. PATENT DOCUMENTS

| | | | |
|---|---|---|---|
| 3,785,793 A | 1/1974 | Park | |
| 3,849,097 A | 11/1974 | Giffen et al. | |
| 3,931,438 A | 1/1976 | Beall et al. | |
| 4,102,664 A | 7/1978 | Dumbaugh | |
| 4,214,886 A | 7/1980 | Shay et al. | |
| 4,824,808 A | 4/1989 | Dumbaugh, Jr. | |
| 4,880,453 A | 11/1989 | Coppola et al. | |
| 5,034,354 A | 7/1991 | Fine | |
| 5,100,452 A | 3/1992 | Dumbaugh | |
| 5,116,787 A | 5/1992 | Dumbaugh, Jr. | |
| 5,116,788 A | 5/1992 | Dumbaugh, Jr. | |
| 5,116,789 A | 5/1992 | Dumbaugh, Jr. | |
| 5,204,291 A | 4/1993 | Nigrin | |
| 5,342,426 A | 8/1994 | Dumbaugh | |
| 5,559,060 A | 9/1996 | Dumbaugh | |
| 7,201,965 B2 | 4/2007 | Gulati et al. | |
| 7,514,149 B2 | 4/2009 | Bocko et al. | |
| 8,007,913 B2 | 8/2011 | Coppola et al. | |
| 8,629,072 B2 | 1/2014 | Brix | |
| 9,212,088 B2 | 12/2015 | Takashima et al. | |
| 2004/0197575 A1* | 10/2004 | Bocko | B32B 17/06 428/432 |
| 2005/0183455 A1* | 8/2005 | Pitbladdo | C03B 17/064 65/29.11 |
| 2007/0190340 A1 | 8/2007 | Coppola et al. | |
| 2011/0201490 A1 | 8/2011 | Barefoot et al. | |
| 2013/0017366 A1* | 1/2013 | Kawaguchi | C03B 17/067 428/141 |
| 2013/0125590 A1 | 5/2013 | Feng et al. | |
| 2014/0106172 A1 | 4/2014 | Dejneka et al. | |
| 2014/0227525 A1* | 8/2014 | Matsuda | C03C 21/002 428/410 |

FOREIGN PATENT DOCUMENTS

| | | |
|---|---|---|
| JP | 2013144634 A | 7/2013 |
| JP | 5336455 | 11/2013 |
| WO | 2013016157 A1 | 1/2013 |
| WO | 2013078038 A1 | 5/2013 |
| WO | 2013130718 A1 | 9/2013 |

OTHER PUBLICATIONS

Kerisit, Pierce, and Ryan "Monte Carlo Simulations of the Corrosion of Aluminoborosilicate Glasses" Journal of Non-Crystalline Solids, dated Jun. 21, 2013, pp. 1-9, Richland, WA.

* cited by examiner

GLASS ARTICLE AND METHOD FOR FORMING THE SAME

This application claims the benefit of priority under 35 U.S.C. § 371 of International Application No. PCT/US2015/020059 filed on Mar. 12, 2015, which claims the benefit of priority of U.S. Provisional Application No. 61/952,580 filed on Mar. 13, 2014 and Provisional Application No. 61/989,717 filed on May 7, 2014, the content of each of which is incorporated herein by reference in its entirety.

BACKGROUND

1. Field

This disclosure relates to glass articles, and more particularly to laminated glass articles comprising at least two glass layers having different degradation rates in a reagent and use of such glass articles for making processed glass articles with defect-free surfaces.

2. Technical Background

Processing or handling a glass article such as a glass rod or a glass sheet can damage the surface of the glass article. For example, a glass sheet can be molded to form a molded glass article having any of a variety of different three-dimensional shapes. During the molding process, any defects present on the surface of the mold can be transferred to the surface of the molded glass article. The resulting defects can be removed from the molded glass article by grinding and polishing, which can be time-consuming, expensive, and awkward to perform, especially on non-flat surfaces. Alternatively, the defects can be removed by acid-etching, which can leave the molded glass article with a visibly roughened surface.

SUMMARY

Disclosed herein are glass articles and methods for forming glass articles. The glass articles comprise a core and a clad. The core comprises a core glass composition, and the clad comprises a clad glass composition different than the core glass composition. A degradation rate of the clad glass composition in a reagent is greater than a degradation rate of the core glass composition in the reagent.

Disclosed herein is a method comprising forming a glass article. The glass article comprises a core and a clad adjacent to the core. The core comprises a core glass composition. The clad comprises a clad glass composition different than the core glass composition. The clad glass composition comprises from about 45 mol % to about 60 mol % $SiO_2$ and from about 8 mol % to about 19 mol % $Al_2O_3$. The clad glass composition is substantially free of As and Cd. A degradation rate of the clad glass composition in a reagent is at least 10 times greater than a degradation rate of the core glass composition in the reagent.

Also disclosed herein is a method comprising forming a laminated glass sheet comprising a core layer disposed between a first cladding layer and a second cladding layer. The first cladding layer and the second cladding layer independently comprise from about 45 mol % to about 60 mol % $SiO_2$ and from about 8 mol % to about 19 mol % $Al_2O_3$. The first cladding layer and the second cladding layer are substantially free of As and Cd. An outer surface of the laminated glass sheet is contacted with a processing unit. The first cladding layer and the second cladding layer are contacted with a reagent to at least partially remove the first cladding layer and the second cladding layer. A ratio of a degradation rate of each of the first cladding layer and the second cladding layer in the reagent to a degradation rate of the core layer in the reagent is at least 10.

Also disclosed herein is a glass article comprising a core and a clad adjacent to the core. The core comprises a core glass composition. The clad comprises a clad glass composition. The clad glass composition comprises from about 45 mol % to about 60 mol % $SiO_2$, from about 8 mol % to about 19 mol % $Al_2O_3$, a coefficient of thermal expansion (CTE) of from about $50 \times 10^{-7}/°$ C. to about $95 \times 10^{-7}/°$ C., and a liquidus viscosity of at least about 50 kP. The clad glass composition is substantially free of Pb, As, and Cd. A ratio of a degradation rate of the clad glass composition in a reagent to a degradation rate of the core glass composition in the reagent is at least about 10.

Also disclosed herein is a glass article comprising a core and a clad substantially enveloping the core. The core comprises a core glass composition. The clad comprises a clad glass composition. The clad glass composition comprises from about 45 mol % to about 60 mol % $SiO_2$, from about 8 mol % to about 19 mol % $Al_2O_3$, a coefficient of thermal expansion (CTE) of from about $50 \times 10^{-7}/°$ C. to about $95 \times 10^{-7}/°$ C., and a liquidus viscosity of at least about 50 kP. The clad glass composition is substantially free of As and Cd. Contacting the glass article with a reagent for about 0.5 hr to about 10 hr causes the clad to be at least partially removed from the core and exposes an outer surface of the core.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Figure 1:
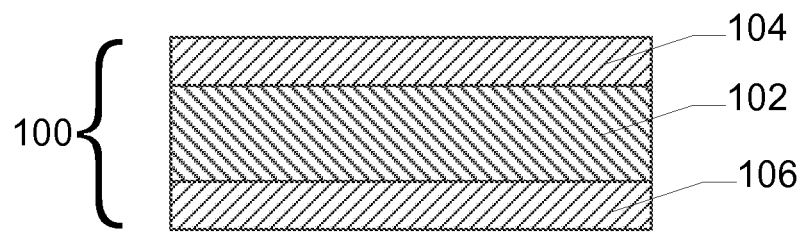
FIG. 1 is a partial cross-sectional view of one exemplary embodiment of a glass article.

Reference will now be made in detail to exemplary embodiments which are illustrated in the accompanying drawings. Whenever possible, the same reference numerals will be used throughout the drawings to refer to the same or like parts. The components in the drawings are not necessarily to scale, emphasis instead being placed upon illustrating the principles of the exemplary embodiments.

As used herein, the term "liquidus viscosity" refers to the shear viscosity of a glass composition at the liquidus temperature of the glass composition.

As used herein, the term "liquidus temperature" refers to the highest temperature at which devitrification occurs in a glass composition.

As used herein, the terms "coefficient of thermal expansion" or "CTE" refer to the coefficient of thermal expansion of a glass composition averaged over a temperature range from about 20° C. to about 300° C.

The term "substantially free," when used herein to describe the absence of a particular oxide component in a glass composition, means that the component is absent from the glass composition or present in the glass composition in a trace amount of less than 0.2 mol %.

Throughout this disclosure, the concentrations of constituent components (e.g., $SiO_2$, $Al_2O_3$, $B_2O_3$, and the like) are given in mole percent (mol %) on an oxide basis, unless otherwise specified.

FIG. 1 is a cross-sectional view of one exemplary embodiment of a glass article comprising a core and a clad adjacent to the core. The clad can be directly adjacent to the core or spaced from the core by one or more intermediate glass layers. In some embodiments, the clad comprises an exterior shell at least partially enveloping the core. The clad can aid in protecting the core during processing and/or handling of the glass article as described herein. In the embodiment shown in FIG. 1, the glass article comprises a laminated glass sheet 100. Glass sheet 100 can be planar as shown in FIG. 1 or non-planar. The core of glass sheet 100 comprises a core layer 102. The core layer can comprise a single layer as shown in FIG. 1 or a plurality of layers. The clad of glass sheet 100 comprises a first cladding layer 104 and a second cladding layer 106. Each of the first cladding layer and the second cladding layer can comprise a single layer as shown in FIG. 1 or a plurality of layers. Core layer 102 is disposed between first cladding layer 104 and second cladding layer 106. First cladding layer 104 and second cladding layer 106 are exterior layers of glass sheet 100. Core layer 102 comprises a first major surface and a second major surface opposite the first major surface. In some embodiments, first cladding layer 104 is fused to the first major surface of core layer 102. Additionally, or alternatively, second cladding layer 106 is fused to the second major surface of core layer 102. The interface between first cladding layer 104 and core layer 102 and/or between second cladding layer 106 and core layer 102 can be free of any bonding material such as, for example, an adhesive, a coating layer, or any other non-glass material added or configured to adhere the respective cladding layer to the core layer. Thus, one or both of cladding layers 104 and 106 are fused directly to core layer 102 and/or disposed directly adjacent to the core layer. In some embodiments, the glass sheet comprises one or more intermediate layers disposed between the core layer and the first cladding layer and/or between the core layer and the second cladding layer. For example, the intermediate layers comprise intermediate glass layers and/or diffusion layers formed at the interface of the core layer and the cladding layer. The diffusion layer can comprise a blended region comprising components of each layer adjacent to the diffusion layer. In some embodiments, glass sheet 100 comprises a glass-glass laminate (e.g., an in situ fused multilayer glass-glass laminate) in which the interfaces between directly adjacent glass layers are glass-glass interfaces.

Figure 2:
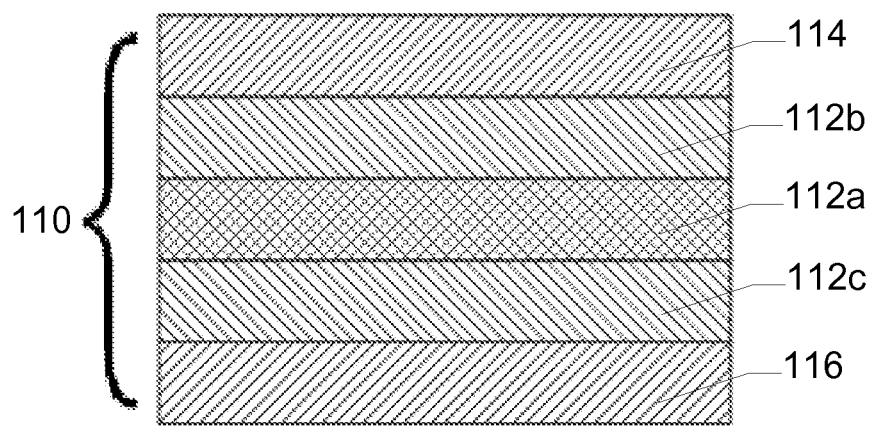
FIG. 2 is a partial cross-sectional view of another exemplary embodiment of a glass article.

FIG. 2 is a cross-sectional view of another exemplary embodiment of a glass article comprising a core and a clad adjacent to the core. In the embodiment shown in FIG. 2, the glass article comprises a laminated glass sheet 110. Glass sheet 110 is similar to glass sheet 100 described with reference to FIG. 1. For example, glass sheet 110 comprises a core layer 112 disposed between a first cladding layer 114 and a second cladding layer 116. Core layer 112 comprises a plurality of layers. For example, in the embodiment shown in FIG. 2, core layer 112 comprises an inner core layer 112a disposed between a first outer core layer 112b and a second outer core layer 112c. First outer core layer 112b is disposed between first cladding layer 114 and inner core layer 112a. Second outer core layer 112c is disposed between second cladding layer 116 and inner core layer 112a.

In some embodiments, the core comprises a core glass composition, and the clad comprises a clad glass composition that is different than the core glass composition. For example, in the embodiment shown in FIG. 1, core layer 102 comprises the core glass composition, and each of first cladding layer 104 and second cladding layer 106 comprises the clad glass composition. In other embodiments, first cladding layer 104 comprises a first clad glass composition, and second cladding layer 106 comprises a second clad glass composition that is different than the core glass composition and/or the first clad glass composition. In the embodiment shown in FIG. 2, inner core layer 112a comprises an inner core glass composition, and each of first outer core layer 112b and second outer core layer 112c comprises an outer core glass composition that is different than the inner core glass composition. In other embodiments, first outer core layer 112b comprises a first outer core glass composition, and second outer core layer 112c comprises a second outer core glass composition that is different than the inner core glass composition and/or the first outer core glass composition.

Figure 3:
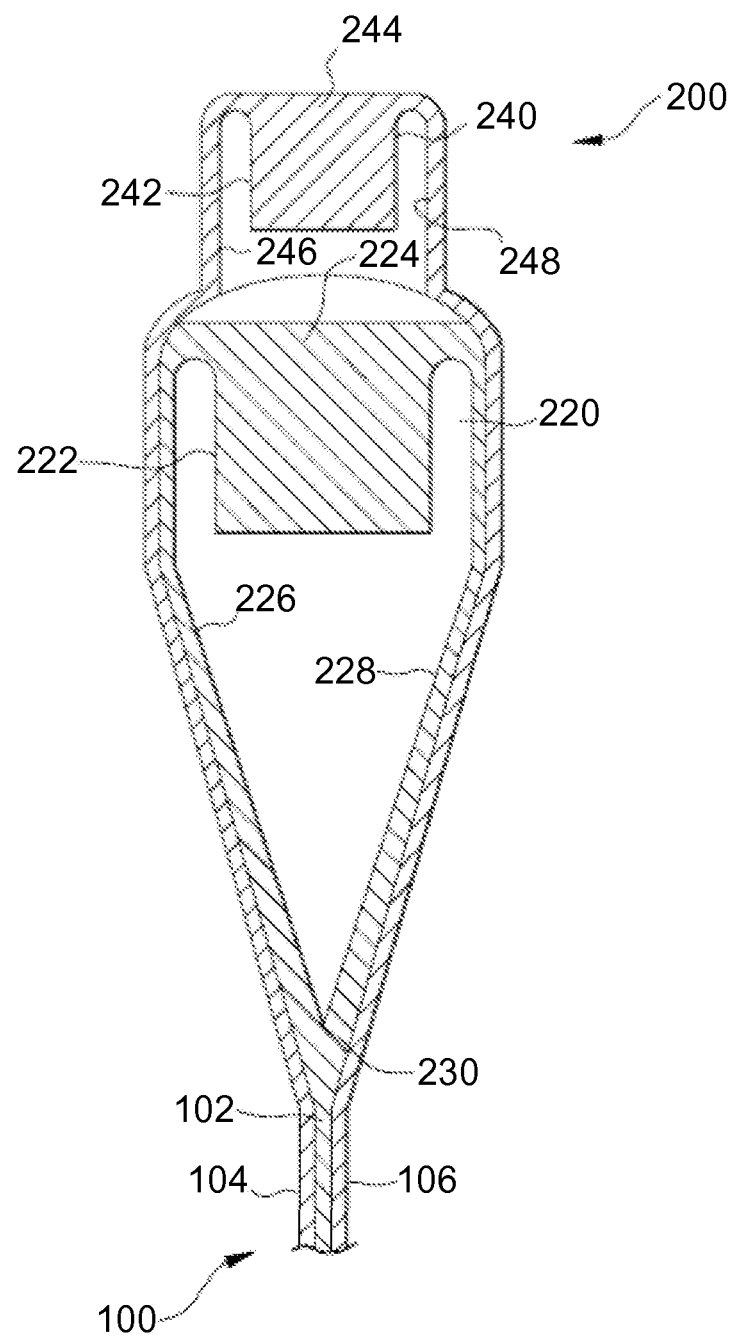
FIG. 3 is a cross-sectional view of one exemplary embodiment of an apparatus for forming a glass article.

The glass article can be formed using a suitable process (e.g., a fusion-draw, down-draw, slot-draw, up-draw, rolling, or offline lamination process). In some embodiments, the glass article is formed using a fusion-draw process. FIG. 3 illustrates one exemplary embodiment of a laminate overflow distributor apparatus 200 that can be used to form a glass article such as, for example, glass sheet 100 using a fusion-draw process. Apparatus 200 is configured generally as described in U.S. Pat. No. 4,214,886, which is incorporated by reference herein in its entirety. Apparatus 200 comprises a lower overflow distributor 220 positioned beneath an upper overflow distributor 240. Lower overflow distributor 220 comprises a trough 222. A first glass composition 224 (e.g., the core glass composition) is melted and fed into trough 222 in a viscous state. First glass composition 224 forms core layer 102 of glass sheet 100. Upper overflow distributor 240 comprises a trough 242. A second glass composition 244 (e.g., the clad glass composition) is melted and fed into trough 242 in a viscous state. Second glass composition 244 forms cladding layers 104 and 106 of glass sheet 100.

First glass composition 224 overflows trough 222 and flows down opposing outer forming surfaces 226 and 228 of lower overflow distributor 220. Outer forming surfaces 226 and 228 converge at a draw line 230. The separate streams of first glass composition 224 flowing down respective outer forming surfaces 226 and 228 of lower overflow distributor 220 converge at draw line 230 where they are fused together to form core layer 102 of glass sheet 100.

Second glass composition 244 overflows trough 242 and flows down opposing outer forming surfaces 246 and 248 of upper overflow distributor 240. Second glass composition 244 is deflected outward by upper overflow distributor 240 such that the second glass composition flows around lower overflow distributor 220 and contacts first glass composition 224 flowing over outer forming surfaces 226 and 228 of the lower overflow distributor. The separate streams of second glass composition 244 are fused to the respective separate streams of first glass composition 224 flowing down respective outer forming surfaces 226 and 228 of lower overflow distributor 220. Upon convergence of the streams of first glass composition 224 at draw line 230, second glass composition 244 forms cladding layers 104 and 106 of glass sheet 100.

In some embodiments, glass sheet 100 is part of a glass ribbon traveling away from draw line 230 of lower overflow distributor 220 as shown in FIG. 3. The glass ribbon is severed to separate glass sheet 100 therefrom. Thus, glass sheet 100 is cut from the glass ribbon. The glass ribbon can be severed using a suitable technique such as, for example, scoring, bending, thermally shocking, and/or laser cutting.

In some embodiments, the glass article (e.g., glass sheet 100 or glass sheet 110) comprises a thickness of at least about 0.05 mm, at least about 0.1 mm, at least about 0.2 mm, at least about 0.3 mm, or at least about 0.5 mm. Additionally, or alternatively, the glass article comprises a thickness of at most about 12.5 mm, at most about 10 mm, at most about 5 mm, at most about 3 mm, at most about 1.5 mm, or at most about 0.5 mm. For example, the glass article comprises a thickness of from about 0.2 mm to about 12.5 mm. Additionally, or alternatively, the core (e.g., core layer 102 or core layer 112) comprises a thickness of from about 0.1 mm to about 12 mm. Additionally, or alternatively, the clad (e.g., each of first cladding layer 104 and second cladding layer 106) comprises a thickness of from about 0.025 mm to about 0.25 mm.

In some embodiments, a ratio of a thickness of the core layer (e.g., core layer 102 or core layer 112) to a thickness of the glass sheet is at least about 0.7, at least about 0.8, at least about 0.85, at least about 0.9, or at least about 0.95. Additionally, or alternatively, a ratio of a thickness of inner core layer 112a to a thickness of core layer 112 is at least about 0.7, at least about 0.8, at least about 0.85, at least about 0.9, or at least about 0.95. In some embodiments, the ratio of the thickness of the core (e.g., core layer 102 or core layer 112) to the thickness of the clad (e.g., the combined thickness of cladding layers 104 and 106) is at least about 1, at least about 3, at least about 5, at least about 7, or at least about 9. Additionally, or alternatively, the ratio of the thickness of the core to the thickness of the clad is at most about 20, at most about 15, or at most about 10.

Although glass sheet 100 shown in FIG. 1 comprises three layers, and glass sheet 110 shown in FIG. 2 comprises five layers, other embodiments are included in this disclosure. In other embodiments, a glass sheet can have a determined number of layers, such as two, four, or more layers. For example, one of the first cladding layer or the second cladding layer can be omitted such that the glass sheet comprises a two-layer glass sheet. A glass sheet comprising two layers can be formed using two overflow distributors positioned so that the two layers are joined while traveling away from the respective draw lines of the overflow distributors or using a single overflow distributor with a divided trough so that two glass compositions flow over opposing outer forming surfaces of the overflow distributor and converge at the draw line of the overflow distributor. A glass sheet comprising four or more layers can be formed using additional overflow distributors and/or using overflow distributors with divided troughs. Thus, a glass sheet having a determined number of layers can be formed by modifying the overflow distributor accordingly. In some embodiments, one or more intermediate layers are disposed between the core layer and a cladding layer. Thus, the cladding layers can be exterior layers regardless of the total number of layers included in the laminated glass sheet.

In some embodiments, the glass article can be configured as a glass rod or filament comprising an elongate core and a cladding layer disposed about the core. The glass article can have a suitable cross-sectional shape such as, for example, circular, elliptical, triangular, rectangular, or another polygonal or non-polygonal shape.

In some embodiments, the glass article comprises a pristine outer surface. The pristine outer surface is substantially smooth and uniform. In the embodiment shown in FIG. 1, glass sheet 100 comprises pristine (i.e., substantially smooth and uniform) outer surfaces (i.e., the outer surfaces of first and second cladding layers 104 and 106). Similarly, in the embodiment shown in FIG. 2, glass sheet 110 comprises pristine outer surfaces (i.e., the outer surfaces of first and second cladding layers 114 and 116). In some embodiments, the pristine outer surfaces of the glass sheet are formed without grinding or polishing. For example, the pristine outer surfaces are formed during the fusion-draw process as described herein. The pristine outer surfaces can be a result of the lack of contact between the outer surfaces and apparatus 200 during formation of the glass sheet.

In some embodiments, the core of the glass article comprises a pristine outer surface. The interface between the core and the clad is substantially smooth and uniform. In the embodiment shown in FIG. 1, core layer 102 of glass sheet 100 comprises pristine (e.g., substantially smooth and uniform) outer surfaces (i.e., the interfaces between the core layer and each of first and second cladding layers 104 and 106). Similarly, in the embodiment shown in FIG. 2, core layer 112 of glass sheet 110 comprises pristine outer surfaces (i.e., the interfaces between the core layer and each of first and second cladding layers 114 and 116). In some embodiments, the pristine outer surfaces of the core layer are formed during the fusion-draw process as described herein.

Figure 4:
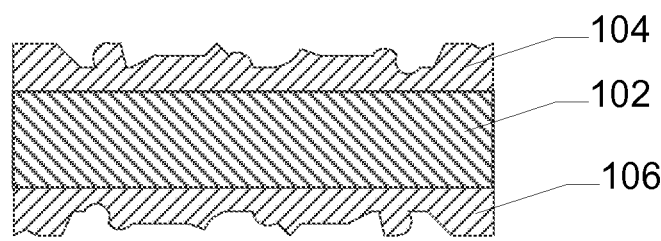
FIG. 4 is a partial cross-sectional view of the glass article shown in FIG. 1 with defects formed in outer surfaces thereof.

In some embodiments, the glass article is subjected to processing and/or handling during which the outer surface of the glass article is engaged by one or more glass processing units. The glass processing unit can comprise suitable equipment used during processing, transportation, and/or storage of the glass article such as, for example, a gripping unit (e.g., a suction cup or a clamp), a conveying unit (e.g., a conveyor, a cart, or a rack), a forming unit (e.g., a mold or a die), or another type of equipment that engages the glass article. FIG. 4 is a partial cross-sectional view of the glass article shown in FIG. 1 following engagement by a processing unit. Engagement of the glass article by the glass processing unit may damage the outer surface of the glass article so that the outer surface of the glass article is no longer pristine. For example, in some embodiments, the outer surface of the glass article comprises defects (e.g., indentations, protrusions, or scratches) following engagement by the processing unit such that the outer surface is non-smooth and/or non-uniform.

In some embodiments, the outer surface of glass sheet 100 is contacted by a forming unit. The forming unit comprises a formed surface, and glass sheet 100 is maintained at a sufficiently high temperature that contacting the glass sheet with the forming unit imparts a shape to the glass sheet that is complementary to the shape of the formed surface. The forming unit engages glass sheet 100 to form a molded glass article. In some embodiments, the formed surface of the forming unit comprises imperfections (e.g., indentations or protrusions) that impart defects to the outer surface of glass sheet 100 during forming of the molded glass article. The imperfections on the formed surface can be the result, for example, of manufacturing defects, wear on the formed surface caused by repeated use, or foreign material disposed on the formed surface. In some embodiments, the outer surface of glass sheet 100 is no longer pristine following engagement by the forming unit. For example, the molded glass article comprises a non-smooth and/or non-uniform outer surface as shown in FIG. 4 following engagement by the forming unit.

Figure 5:
FIG. 5 is a partial cross-sectional view of the glass article shown in FIGS. 1 and 3 with clad removed.

In some embodiments, the defects on the outer surface of the glass article are confined to the clad and do not extend into the core. For example, the defects are confined to first cladding layer 104 and/or second cladding layer 106 and do not extend into core layer 102 as shown in FIG. 4. The clad protects the core from damage during handling and/or processing. In some embodiments, the clad is partially or substantially entirely removed from the core to expose the outer surface of the core. FIG. 5 is a partial cross-sectional view of the glass article shown in FIGS. 1 and 4 following removal of the clad. The damaged clad is removed from the core to expose the pristine outer surface of the core. For example, in some embodiments, first cladding layer 104 and second cladding layer 106 are removed from core layer 102 to expose the outer surface of the core layer as shown in FIG. 5. The exposed outer surface of core layer 102 comprises a pristine surface. Removing first and second cladding layers 104 and 106 removes the defects in the first and second cladding layers from the glass article, leaving the glass article with a pristine surface substantially free of the defects imparted to the glass article by the processing unit.

Figure 6:
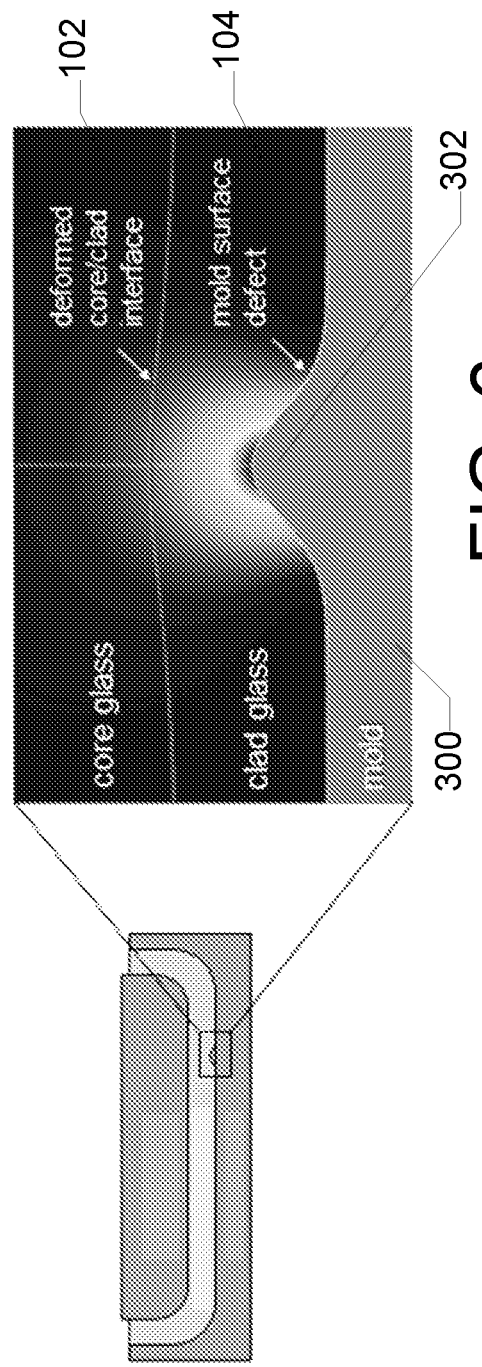
FIG. 6 illustrates a simulated response of one exemplary embodiment of a glass sheet to being contacted with one exemplary embodiment of a forming surface comprising a protrusion.

FIG. 6 illustrates a simulated response of glass sheet 100 to being contacted with one exemplary embodiment of a forming surface 300 comprising a protrusion 302. In some embodiments, first cladding layer 104 at least partially absorbs the effect of protrusion 302, thereby minimizing the defect of core layer 102 at the interface between the core layer and the first cladding layer resulting from protrusion 302. In other words, the defect in core layer 102 at the interface is wider and smaller in amplitude compared to the defect in first cladding layer 104 at the surface of glass sheet 100 resulting from protrusion 302.

Figure 7:
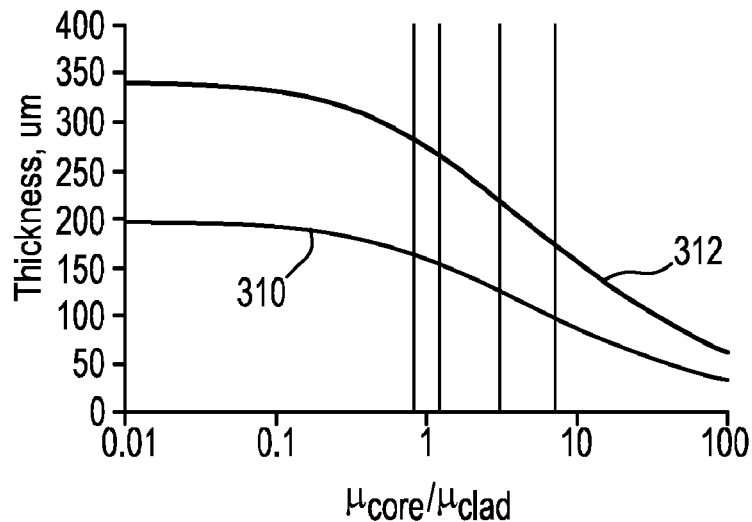
FIG. 7 is a graphical illustration of a predicted clad thickness sufficient to avoid a visible defect in a core layer of one exemplary embodiment of a glass sheet resulting from one exemplary protrusion of a forming surface.
Figure 8:
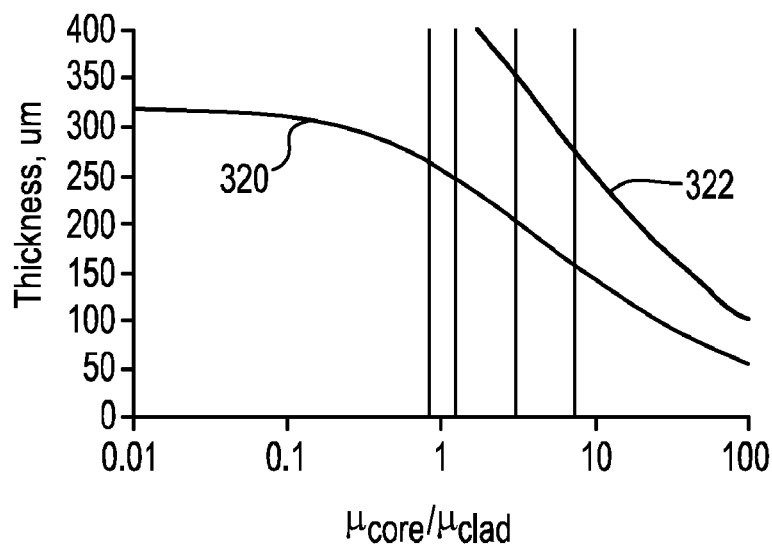
FIG. 8 is a graphical illustration of a predicted clad thickness sufficient to avoid a visible defect in a core layer of one exemplary embodiment of a glass sheet resulting from another exemplary protrusion of a forming surface.

The size of the defect in the core layer resulting from the protrusion on the forming surface relative to the size of the protrusion depends on a core to clad viscosity ratio and the clad thickness. FIGS. 7 and 8 are graphical illustrations of predicted clad thickness sufficient to avoid a visible defect in core layer 102 resulting from protrusion 302 on forming surface 300. The data presented in FIG. 7 are calculated based on protrusion 302 having an amplitude of 5 μm and a width of 20 μm. The visibility of the defect in the core layer is related to the slope of the defect. Curve 310 corresponds to the defect in core layer 102 having a slope of 1/1000. Curve 312 corresponds to the defect in core layer 102 having a slope of 1/5000. The data presented in FIG. 8 are calculated based on protrusion 302 having an amplitude of 20 μm and a width of 20 μm. Curve 320 corresponds to the defect in core layer 102 having a slope of 1/1000. Curve 322 corresponds to the defect in core layer 102 having a slope of 1/5000. FIGS. 7-8 illustrate that the clad thickness sufficient to avoid a visible defect in the core decreases as the core to clad viscosity ratio increases. Thus, a thinner clad is sufficient to avoid a visible defect in the core at higher core to clad viscosity ratios.

In some embodiments, at least one of the clad thickness or the core to clad viscosity ratio is adjusted based on a surface condition of the forming surface. For example, the surface condition comprises an expected protrusion size or surface roughness. Thus, the clad thickness and/or the core to clad viscosity ratio is adjusted based on the surface condition of the forming surface to achieve a core that is substantially free of visible defects. For example, the core layer can be made more resistant to visible defects by increasing the core viscosity, decreasing the clad viscosity, and/or increasing the clad thickness. The ability to adjust the resistance of the core layer to visible defects can enable the glass sheet to be tailored to a mold surface. For example, the core viscosity can be increased with increasing mold wear. Additionally, or alternatively, the clad viscosity can be decreased with increasing mold wear. Additionally, or alternatively, the clad thickness can be increased with increasing mold wear. The mold wear can represent, for example, the length of time that a mold is in service or a number of glass articles formed in the mold.

In some embodiments, glass sheet 110 is engaged by a glass processing unit as described herein with reference to glass sheet 100. For example, the outer surface of glass sheet 110 is contacted by a forming unit that imparts defects to the outer surface of the glass sheet during forming of the molded glass article. In some embodiments, the defects are confined to first cladding layer 114 and/or second cladding layer 116 and do not extend into core layer 112. In some embodiments, first cladding layer 114 and second cladding layer 116 are at least partially removed from core layer 112 to expose the outer surface of the core layer, which can comprise a pristine surface.

Protection of the core by the clad can prevent damage from being caused to the core of the glass article during handling and/or processing. Damage caused to the glass article can be removed by removing the clad. Protection of the core by the clad can enable use of a forming unit with imperfections on the formed surface thereof. This can lengthen the amount of time that the forming unit can be used before replacement or repair or reconditioning of the formed surface (i.e., the useful life of the forming unit). Protection of the core by the clad can enable production of the molded glass article with a pristine outer surface without grinding or polishing the molded glass article.

In some embodiments, the clad is less durable than the core. For example, in the embodiment shown in FIG. 1, first cladding layer 104 and second cladding layer 106 are less durable than core layer 102. In the embodiment shown in FIG. 2, first cladding layer 114 and second cladding layer 116 are less durable than first outer core layer 112b and second outer core layer 112c. In some embodiments, inner core layer 112a is enveloped within first and second outer core layers 112b and 112c. Because inner core layer 112a is protected by first and second outer core layers 112b and 112c, the inner core layer can be more durable or less durable than first and second cladding layers 114 and 116 or first and second outer core layers 112b and 112c. The clad glass composition (e.g., of first and second cladding layers 104 and 106 or of first and second cladding layers 114 and 116) comprises a greater degradation rate in a reagent than the core glass composition (e.g., of core layer 102 or of first and second outer core layers 112b and 112c). In some embodiments, the degradation rate of the clad glass composition in the reagent is at least 10 times greater than the degradation rate of the core glass composition in the reagent. In some embodiments, the glass article is contacted with the reagent to remove at least a portion of the clad from the core and expose the outer surface of the core. The difference in durability between the clad and the core can enable the clad to be removed from the core by contacting the glass article with the reagent to degrade or dissolve the clad without substantially degrading or dissolving the core.

The reagent comprises a suitable component capable of degrading or dissolving the glass article (e.g., the clad and/or the core). For example, the reagent comprises an acid, a base, another suitable component, or a combination thereof. In some embodiments, the reagent comprises an acid such as, for example, a mineral acid (e.g., HCl, $HNO_3$, $H_2SO_4$, $H_3PO_4$, $H_3BO_3$, HBr, $HClO_4$, or HF), a carboxylic acid (e.g., $CH_3COOH$), or a combination thereof. For example, in some embodiments, the reagent comprises HCl (e.g., 50 vol % HCl in water). Additionally, or alternatively, the reagent comprises $HNO_3$. In some embodiments, the reagent comprises a base such as, for example, LiOH, NaOH, KOH, RbOH, CsOH, $Ca(OH)_2$, $Sr(OH)_2$, $Ba(OH)_2$, or a combination thereof.

In some embodiments, the reagent is substantially free of HF. HF reacts with many different oxides, and therefore, is highly reactive with most glass compositions. For example, HF reacts with silicon dioxide to form gaseous or water-soluble silicon fluorides. Contacting the core of the glass article with a reagent comprising HF may result in reaction of the HF with the core, which can cause roughening or marring of the core surface. Using a reagent that is substantially free of HF may prevent substantial reaction of the reagent with the core to enable removal of the clad from the core without damaging the core surface.

In some embodiments, the glass article is contacted with the reagent to at least partially remove the clad from the core as described herein. Upon removal of the clad, the core can be at least partially exposed. For example, the core is at least partially exposed in response to contacting the laminated glass article with the reagent for at least about 0.1 hr, at least about 0.5 hr, at least about 1 hr, or at least about 2 hr. Additionally, or alternatively, the core is at least partially exposed in response to contacting the laminated glass article with the reagent for at most about 10 hr, at most about 5 hr, or at most about 2 hr. The conditions under which the glass article is contacted with the reagent (e.g., the concentration of the reagent, the temperature, and/or the use of ultrasonic agitation) can be adjusted to adjust the rate of degradation of the clad.

In some embodiments, the reagent comprises a first reagent and a second reagent. The glass article is contacted with the first reagent to remove a first portion of the clad from the core and then contacted with the second reagent to remove a second portion of the clad from the core. In some embodiments, the first reagent comprises HF. The glass article is contacted with the first reagent for a sufficiently short time that the core remains substantially enveloped within the clad after contacting the glass article with the first reagent and before contacting the glass article with the second reagent. The first reagent comprising HF can be used to degrade the first portion of the clad relatively quickly without contacting the core with the first reagent, which can damage the outer surface of the core. In some embodiments, the second reagent is substantially free of HF. Additionally, or alternatively, the degradation rate of the clad in the second reagent is greater than the degradation rate of the core in the second reagent as described herein. The core can be contacted with the second reagent (e.g., following removal of the second portion of the clad) without damaging the outer surface of the core.

In some embodiments, the outer surface of the core is contacted by the reagent following removal of the clad (e.g., substantially complete or partial removal of the clad). Although the core is more durable than the clad, in some embodiments, the reagent degrades the core to some degree. Upon contacting the core with the reagent, at least a portion of the core can be degraded by the reagent such that an outermost portion of the outer surface of the core is removed. For example, the removed outermost portion is up to about 1 μm thick. This can aid in strengthening the core, for example, by blunting fracture tips at the surface of the core.

In some embodiments, ion exchange is caused between the clad and the core. Smaller cations (e.g., monovalent alkali metal cations or divalent alkaline earth metal cations) present in the core (e.g., core layer 102 or first and second outer core layers 112b and 112c) are replaced with larger cations (e.g., monovalent alkali metal cations, divalent alkaline earth metal cations, or $Ag^+$) present in the clad (e.g., first and second cladding layers 104 and 106 or first and second cladding layers 114 and 116). For example, in some embodiments, $Na^+$ present in the core is replaced with $K^+$ present in the clad. The smaller cations and the larger cations can have the same valence or oxidation state. The replacement of smaller cations with larger cations creates a surface layer in the core that is under compression or compressive stress (CS). The surface layer extends into the interior or bulk of the core to a depth of layer (DOL). This can aid in increasing the strength of the glass article following removal of the clad. The compressive stress in the surface layer is balanced by a tensile stress (TS) or central tension in an interior region of the core. The ion exchange can be caused by a suitable method such as, for example, heating the glass article prior to removing the clad from the core.

In some embodiments, the first and second outer core layers 112b and 112c are ion exchangeable. Thus, the glass article can be subjected to an ion exchange process after removal of the clad to create a surface layer in the outer core layers that is under compression or compressive stress. The ion exchange process can include a suitable ion exchange process including, for example, contacting the glass article with a molten salt.

In some embodiments, each of the core glass composition and the clad glass composition comprises properties (e.g., liquidus viscosity, liquidus temperature, and CTE) suitable for formation of the glass article (e.g., the laminated glass sheet 100 or the laminated glass sheet 110) using a fusion-draw process as described herein. Additionally, or alternatively, the clad glass composition is less durable than the core glass composition as described herein.

In some embodiments, the core glass composition comprises from about 62 mol % to about 77 mol % $SiO_2$. Additionally, or alternatively, the core glass composition comprises from about 2 mol % to about 13 mol % $Al_2O_3$. Additionally, or alternatively, the core glass composition comprises from about 0 mol % to about 10 mol % $B_2O_3$. Additionally, or alternatively, the core glass composition comprises an alkali metal oxide selected from the group consisting of $Na_2O$, $K_2O$, and combinations thereof. For example, the core glass composition comprises from about 0 mol % to about 15 mol % $Na_2O$ and/or from about 0 mol % to about 12 mol % $K_2O$. Additionally, or alternatively, the core glass composition comprises an alkaline earth oxide selected from the group consisting of CaO, MgO, SrO, BaO, and combinations thereof. For example, the core glass composition comprises from about 0 mol % to about 1 mol % CaO, from about 2 mol % to about 7 mol % MgO from about 0 mol % to about 7 mol % SrO, and/or from about 0 mol % to about 3 mol % BaO. Additionally, or alternatively, the core glass composition comprises from about 0 mol % to about 1 mol % $SnO_2$. In some embodiments, the difference between the alkali metal oxide ($R_2O$) concentration of the core glass composition and the $Al_2O_3$ concentration of the core glass composition is from about 1 to about 9.

Although exemplary embodiments of the core glass composition are described herein, the core glass composition can comprise suitable components in suitable amounts such that the core glass composition is compatible with the clad glass composition for formation of the glass article as described herein. For example, the liquidus viscosity, liquidus temperature, and/or CTE of the core glass composition relative to those of the clad glass composition can enable formation of the glass article using a fusion-draw process as described herein. Also for example, the core glass composition can be more durable in the reagent than the clad glass composition as described herein. Thus, the core glass composition is not limited to the exemplary embodiments described herein.

In the embodiments described herein, the clad glass composition comprises $SiO_2$, which can serve as a glass network former. For example, the second glass composition comprises from about 45 mol % to about 60 mol % $SiO_2$. If the concentration of $SiO_2$ is too low, the clad glass composition can be incompatible with Zr, which is a common component found in fusion-draw equipment (e.g., in refractory). If the concentration of $SiO_2$ is too high, the clad glass composition can have an undesirably high durability and can have a sufficiently high melting point to adversely impact the formability of the glass.

In the embodiments described herein, the clad glass composition comprises $Al_2O_3$, which can serve as a glass network former. For example, the clad glass composition comprises from about 8 mol % to about 19 mol % $Al_2O_3$. The presence of $Al_2O_3$ can reduce the liquidus temperature of the clad glass composition, thereby increasing the liquidus viscosity of the clad glass composition. If the concentration of $Al_2O_3$ is too low, the clad glass composition can be undesirably soft (e.g., the strain point can be undesirably low) and can have an undesirably high CTE. If the concentration of $Al_2O_3$ is too high, the clad glass composition can be incompatible with Zr and can have an undesirably high durability.

In some embodiments, the clad glass composition comprises $B_2O_3$, which can serve as a glass network former. For example, the clad glass composition comprises from about 0 mol % to about 25 mol % $B_2O_3$. The presence of $B_2O_3$ can reduce the durability of the second glass composition. Additionally, or alternatively, the presence of $B_2O_3$ can reduce the viscosity and the liquidus temperature of the clad glass composition. For example, increasing the concentration of $B_2O_3$ by 1 mol % can decrease the temperature required to obtain an equivalent viscosity by about 10° C. to about 14° C., depending on the glass composition. However, increasing the concentration of $B_2O_3$ by 1 mol % can lower the liquidus temperature by about 18° C. to about 22° C., depending on the glass composition. Thus, $B_2O_3$ can reduce the liquidus temperature of the glass composition more rapidly than it decreases the liquidus viscosity. If the concentration of $B_2O_3$ is too low, the clad glass composition can have an undesirably high durability. If the concentration of $B_2O_3$ is too high, the clad glass composition can be undesirably soft.

In some embodiments, the clad glass composition comprises an alkali metal oxide selected from the group consisting of $Li_2O$, $Na_2O$, $K_2O$, $Rb_2O$, $CS_2O$, and combinations thereof. For example, the clad glass composition comprises from about 0 mol % to about 8 mol % $Li_2O$. Additionally, or alternatively, the clad glass composition comprises from about 0 mol % to about 21 mol % $Na_2O$. Additionally, or alternatively, the clad glass composition comprises from about 0 mol % to about 12 mol % $K_2O$. The alkali metal oxide can serve as a modifier. For example, the presence of $Na_2O$ can reduce the melting temperature of the clad glass composition, which can enhance the formability of the clad glass composition. In embodiments comprising $Na_2O$, if the concentration of $Na_2O$ is too low, the clad glass composition can have an undesirably high durability. If the concentration of $Na_2O$ is too high, the core glass composition can have an undesirably high CTE.

In some embodiments, the clad glass composition comprises an alkaline earth oxide selected from the group consisting of CaO, MgO, SrO, and combinations thereof. For example, the clad glass composition comprises from about 0 mol % to about 10 mol % CaO. Additionally, or alternatively, the clad glass composition comprises from about 0 mol % to about 2 mol % MgO. Additionally, or alternatively, the clad glass composition comprises from about 0 mol % to about 2 mol % SrO.

In some embodiments, the clad glass composition comprises a fining agent selected from the group consisting of $SnO_2$, $Sb_2O_3$, $Ce_2O_3$, Cl (e.g., derived from KCl or NaCl), and combinations thereof. For example, the clad glass composition comprises from about 0 mol % to about 0.1 mol % $SnO_2$.

In some embodiments, the clad glass composition comprises $P_2O_5$. For example, the clad glass composition comprises from about 0 mol % to about 10 mol % $P_2O_5$.

In some embodiments, the clad glass composition comprises trace amounts of $ZrO_2$. For example, the clad glass composition comprises from about 0 mol % to about 0.02 mol % $ZrO_2$.

In some embodiments, the clad glass composition is substantially free of any or all of Pb, As, Cd, and Ba (i.e., constituents comprising the listed elements). For example, the clad glass composition is substantially free of Pb. Additionally, or alternatively, the clad glass composition is substantially free of As. Additionally, or alternatively, the clad glass composition is substantially free of Cd. Additionally, or alternatively, the clad glass composition is substantially free of Ba.

In some embodiments, the glass article can be formed using a fusion-draw process as described herein. In some embodiments, the CTE of the clad glass composition is less than or equal to the CTE of the core glass composition. For example, the CTE of the clad glass composition is from about $0\times10^{-7}/°$ C. to about $50\times10^{-7}/°$ C. less than the CTE of the core glass composition, from about $0\times10^{-7}/°$ C. to about $30\times10^{-7}/°$ C. less than the CTE of the core glass composition, or from about $0\times10^{-7}/°$ C. to about $10\times10^{-7}/°$ C. less than the CTE of the core glass composition. In some embodiments, the clad glass composition comprises a CTE of from about $50\times10^{-7}/°$ C. to about $95\times10^{-7}/°$ C. In some embodiments, a liquidus viscosity of the clad glass composition is at least about 50 kP, at least about 80 kP, or at least about 100 kP.

In some embodiments, the core layer of the glass article comprises a plurality of layers. For example, in the embodiment shown in FIG. 2, the core layer comprises three layers. In some of such embodiments, the CTE of the outer core glass composition is less than or equal to the CTE of the inner core glass composition. For example, the CTE of the outer core glass composition is from about $0\times10^{-7}/°$ C. to about $50\times10^{-7}/°$ C. less than the CTE of the inner core glass composition, from about $0\times10^{-7}/°$ C. to about $30\times10^{-7}/°$ C. less than the CTE of the inner core glass composition, or from about $0\times10^{-7}/°$ C. to about $10\times10^{-7}/°$ C. less than the CTE of the inner core glass composition. Thus, the first and second outer core layers 112b and 112c comprise a compressive stress, and inner core layer 112a comprises a tensile stress as a result of the CTE mismatch between the first and second outer core layers and the inner core layer. The compressive stress can aid in strengthening the glass article following removal of the clad to expose the core. In other words, the core comprises a strengthened core. In some embodiments, the CTE of each of the clad glass composition and the outer core glass composition is less than or equal to the CTE of the inner core glass composition.

In some embodiments, a ratio of the degradation rate of the clad glass composition in the reagent to the degradation rate of the core glass composition in the reagent is at least about 10, at least about 100, or at least about 1000. The degradation rate can be expressed, for example, in terms of weight loss relative to the original weight of the sample after contact with the reagent for a given period of time, in terms of weight loss per surface area of the sample per unit of time upon contact with the reagent, or another suitable manner. For example, the degradation rate of the clad glass composition, expressed in terms of weight loss relative to the original weight of the sample after contact by a 50 vol % aqueous HCl solution at 60° C. in an ultrasonic bath for 30 min, is at least about 0.9%, at least about 5%, at least about 10%, or at least about 20%. Additionally, or alternatively, the degradation rate of the clad glass composition, expressed in terms of weight loss relative to the original weight of the sample after contact by a 50 vol % aqueous HCl solution at 60° C. in an ultrasonic bath for 30 min, is at most about 30%. Additionally, or alternatively, the degradation rate of the core glass composition, expressed in terms of weight loss relative to the original weight of the sample after contact by a 50 vol % aqueous HCl solution at 60° C. in an ultrasonic bath for 30 min, is at most about 2%, at most about 0.1%, or at most about 0.01%.

Based on the foregoing, it should be understood that various embodiments of relatively low durability glass compositions (e.g., for use as the clad glass composition of the glass article) are disclosed herein. In one exemplary embodiment, the clad glass composition comprises from about 45 mol % to about 60 mol % $SiO_2$, from about 13 mol % to about 19 mol % $Al_2O_3$, from about 5 mol % to about 23 mol % $B_2O_3$, and from about 3 mol % to about 21 mol % $Na_2O$. Additionally, or alternatively, the degradation rate of the clad glass composition, expressed in terms of weight loss relative to the original weight of the sample after contact by a 50 vol % aqueous HCl solution at 60° C. in an ultrasonic bath for 30 min, is from about 0.9% to about 29%. Additionally, or alternatively, the degradation rate of the clad glass composition is at least 10 times greater than the degradation rate of the core glass composition.

In another exemplary embodiment, the clad glass composition comprises from about 55 mol % to about 59 mol % $SiO_2$, from about 12 mol % to about 16 mol % $Al_2O_3$, from about 13 mol % to about 17 mol % $B_2O_3$, and from about 12 mol % to about 16 mol % $Na_2O$. Additionally, or alternatively, the degradation rate of the clad glass composition, expressed in terms of weight loss relative to the original weight of the sample after contact by a 50 vol % aqueous HCl solution at 60° C. in an ultrasonic bath for 30 min, is from about 1% to about 3%. Additionally, or alternatively, the degradation rate of the clad glass composition is at least 10 times greater than the degradation rate of the core glass composition.

In another exemplary embodiment, the clad glass composition comprises from about 47 mol % to about 51 mol % $SiO_2$, from about 13 mol % to about 17 mol % $Al_2O_3$, from about 17 mol % to about 21 mol % $B_2O_3$, from about 13 mol % to about 17 mol % $Na_2O$, and from about 0 mol % to about 4 mol % CaO. Additionally, or alternatively, the degradation rate of the clad glass composition, expressed in terms of weight loss relative to the original weight of the sample after contact by a 50 vol % aqueous HCl solution at 60° C. in an ultrasonic bath for 30 min, is from about 22% to about 25%. Additionally, or alternatively, the degradation rate of the clad glass composition is at least 10 times greater than the degradation rate of the core glass composition.

In some embodiments, a display (e.g., an LED or LCD display) comprises a glass article as described herein. For example, the display comprises a cover glass comprising the glass article. In some embodiments, the cover glass comprises an integrated cover glass and color filter. In some embodiments, the cover glass comprises an integrated touch cover glass.

In some embodiments, an automotive glazing comprises a glass article as described herein. The automotive glazing comprises, for example, a windshield, a sidelite (e.g., a door glass or a quarter window), a sun roof, a moon roof, a rear backlite, or another suitable glass or window.

In some embodiments, an architectural panel comprises a glass article as described herein.

Various embodiments of the glass articles described herein can be used for a variety of applications including, for example, for cover glass or glass backplane applications in consumer or commercial electronic devices including, for example, LCD and LED displays, computer monitors, and automated teller machines (ATMs); for touch screen or touch sensor applications; for portable electronic devices including, for example, mobile telephones, personal media players, and tablet computers; for integrated circuit applications including, for example, semiconductor wafers; for photovoltaic applications; for architectural glass applications; for automotive or vehicular glass applications; for commercial or household appliance applications; or for lighting applications including, for example, solid state lighting (e.g., luminaires for LED lamps).

EXAMPLES

Various embodiments will be further clarified by the following examples.

A plurality of core glass compositions, which can be suitable for use as a core of a glass article, were prepared according to the batch compositions listed in Table 1 below. Batches of the oxide constituent components were mixed, melted, and formed into glass plates. The properties of the glass melt and the resultant glass article were measured and the results are reported in Table 2. The degradation rates reported in Table 2 are expressed in terms of weight loss relative to the original weight of the sample after contact by a 50 vol % aqueous HCl solution at 60° C. in an ultrasonic bath for 30 min.

TABLE 1

Exemplary Core Glass Compositions

| Sample | $SiO_2$ (mol %) | $Al_2O_3$ (mol %) | $B_2O_3$ (mol %) | $Na_2O$ (mol %) | $K_2O$ (mol %) | MgO (mol %) | CaO (mol %) | $SnO_2$ (mol %) |
|---|---|---|---|---|---|---|---|---|
| 1-1 | 66 | 10.26 | 0.58 | 14.23 | 2.37 | 5.75 | 0.59 | 0.21 |
| 1-2 | 69.18 | 8.47 | 0 | 13.92 | 1.16 | 6.54 | 0.53 | 0.19 |
| 1-3 | 68.84 | 10.63 | 0 | 14.86 | 0.02 | 5.43 | 0.04 | 0.17 |
| 1-4 | 67.45 | 12.69 | 3.67 | 13.67 | 0.02 | 2.36 | 0.03 | 0.09 |

TABLE 2

Properties of Exemplary Core Glass Compositions

| Sample | Degrad'n Rate (%) | CTE ($\times 10^{-7}$/° C.) | Liquidus Temp (° C.) | Liquidus Visc (kP) | Strain Pt (° C.) | Anneal Pt (° C.) | Soft Pt (° C.) | Density (g/cm$^3$) |
|---|---|---|---|---|---|---|---|---|
| 1-1 | 0.01 | 91.1 | 900 | 4250 | 551 | 600 | 843 | 2.452 |
| 1-2 | 0.01 | 83.6 | 950 | 1498 | 560 | 609 | 844 | 2.444 |
| 1-3 | 0 | 80.1 | 1070 | nm | 602 | 652 | 900 | 2.432 |
| 1-4 | 0 | 74.6 | 1002 | 2210 | 589 | 644 | 922 | 2.403 |

A plurality of clad glass compositions, which can be suitable for use as a clad of a glass article, were prepared according to the batch compositions listed in Table 3 below. Batches of the oxide constituent components were mixed, melted, and formed into glass plates. The properties of the glass melt and the resultant glass article were measured and the results are reported in Table 4. The degradation rates reported in Table 4 are expressed in terms of weight loss relative to the original weight of the sample after contact by a 50 vol % aqueous HCl solution at 60° C. in an ultrasonic bath for 30 min.

TABLE 3

Exemplary Clad Glass Compositions

| Sample | $SiO_2$ (mol %) | $Al_2O_3$ (mol %) | $B_2O_3$ (mol %) | CaO (mol %) | $Li_2O$ (mol %) | $Na_2O$ (mol %) | $K_2O$ (mol %) | $SnO_2$ (mol %) | $ZrO_2$ (mol %) | $P_2O_5$ (mol %) |
|---|---|---|---|---|---|---|---|---|---|---|
| 2-1 | 57 | 18.8 | 5 | 0 | 0 | 18.7 | 0.5 | 0.1 | 0.02 | 0 |
| 2-2 | 55 | 18.8 | 7 | 0 | 0 | 18.7 | 0.5 | 0.1 | 0.02 | 0 |
| 2-3 | 53 | 18.8 | 9 | 0 | 0 | 18.7 | 0.5 | 0.1 | 0.02 | 0 |
| 2-4 | 51 | 18.8 | 11 | 0 | 0 | 18.7 | 0.5 | 0.1 | 0.02 | 0 |
| 2-5 | 49 | 18.8 | 13 | 0 | 0 | 18.7 | 0.5 | 0.1 | 0.02 | 0 |
| 2-6 | 57 | 18.8 | 5 | 0 | 2 | 16.7 | 0.5 | 0.1 | 0.02 | 0 |
| 2-7 | 57 | 18.8 | 5 | 0 | 4 | 14.7 | 0.5 | 0.1 | 0.02 | 0 |
| 2-8 | 57 | 18.8 | 5 | 0 | 8 | 10.7 | 0.5 | 0.1 | 0.02 | 0 |
| 2-9 | 57 | 18 | 7 | 0 | 0 | 18 | 0 | 0.1 | 0 | 0 |
| 2-10 | 57 | 17 | 9 | 0 | 0 | 17 | 0 | 0.1 | 0 | 0 |
| 2-11 | 57 | 16 | 11 | 0 | 0 | 16 | 0 | 0.1 | 0 | 0 |
| 2-12 | 57 | 15 | 13 | 0 | 0 | 15 | 0 | 0.1 | 0 | 0 |
| 2-13 | 57.13 | 13.96 | 15.16 | 0.02 | 0 | 13.63 | 0 | 0.09 | 0 | 0 |
| 2-14 | 57 | 13 | 17 | 0 | 0 | 13 | 0 | 0.1 | 0 | 0 |
| 2-15 | 57.9 | 15 | 10 | 2 | 0 | 15 | 0 | 0.1 | 0 | 0 |
| 2-16 | 57.9 | 15 | 10 | 2 | 0 | 12 | 3 | 0.1 | 0 | 0 |
| 2-17 | 57.9 | 15 | 10 | 2 | 0 | 9 | 6 | 0.1 | 0 | 0 |
| 2-18 | 57.9 | 15 | 10 | 2 | 0 | 6 | 9 | 0.1 | 0 | 0 |
| 2-19 | 57.9 | 15 | 10 | 2 | 0 | 3 | 12 | 0.1 | 0 | 0 |
| 2-20 | 55 | 15 | 13 | 2 | 0 | 6 | 9 | 0.1 | 0 | 0 |
| 2-21 | 55 | 15 | 13 | 2 | 0 | 9 | 6 | 0.1 | 0 | 0 |
| 2-22 | 55 | 15 | 13 | 2 | 0 | 12 | 3 | 0.1 | 0 | 0 |
| 2-23 | 55 | 15 | 13 | 2 | 0 | 15 | 0 | 0.1 | 0 | 0 |

TABLE 3-continued

Exemplary Clad Glass Compositions

| Sample | SiO$_2$ (mol %) | Al$_2$O$_3$ (mol %) | B$_2$O$_3$ (mol %) | CaO (mol %) | Li$_2$O (mol %) | Na$_2$O (mol %) | K$_2$O (mol %) | SnO$_2$ (mol %) | ZrO$_2$ (mol %) | P$_2$O$_5$ (mol %) |
|---|---|---|---|---|---|---|---|---|---|---|
| 2-24 | 53 | 15 | 15 | 2 | 0 | 6 | 9 | 0.1 | 0 | 0 |
| 2-25 | 53 | 15 | 15 | 2 | 0 | 9 | 6 | 0.1 | 0 | 0 |
| 2-26 | 53 | 15 | 15 | 2 | 0 | 12 | 3 | 0.1 | 0 | 0 |
| 2-27 | 53 | 15 | 15 | 2 | 0 | 15 | 0 | 0.1 | 0 | 0 |
| 2-28 | 51 | 15 | 17 | 2 | 0 | 6 | 9 | 0.1 | 0 | 0 |
| 2-29 | 51 | 15 | 17 | 2 | 0 | 9 | 6 | 0.1 | 0 | 0 |
| 2-30 | 51 | 15 | 17 | 2 | 0 | 12 | 3 | 0.1 | 0 | 0 |
| 2-31 | 51 | 15 | 17 | 2 | 0 | 15 | 0 | 0.1 | 0 | 0 |
| 2-32 | 56 | 16 | 11 | 2 | 0 | 16 | 0 | 0.07 | 0 | 0 |
| 2-33 | 56 | 16 | 11 | 4 | 0 | 16 | 0 | 0.07 | 0 | 0 |
| 2-34 | 56 | 18 | 7 | 1 | 0 | 18 | 0 | 0.07 | 0 | 0 |
| 2-35 | 56 | 18 | 7 | 2 | 0 | 18 | 0 | 0.07 | 0 | 0 |
| 2-36 | 56 | 18 | 7 | 4 | 0 | 18 | 0 | 0.07 | 0 | 0 |
| 2-37 | 55 | 17 | 11 | 0 | 0 | 17 | 0 | 0.07 | 0 | 0 |
| 2-38 | 54 | 17.5 | 11 | 0 | 0 | 17.5 | 0 | 0.07 | 0 | 0 |
| 2-39 | 53 | 18 | 11 | 0 | 0 | 18 | 0 | 0.07 | 0 | 0 |
| 2-40 | 55 | 16 | 13 | 0 | 0 | 16 | 0 | 0.07 | 0 | 0 |
| 2-41 | 54 | 16 | 14 | 0 | 0 | 16 | 0 | 0.07 | 0 | 0 |
| 2-42 | 53 | 16 | 15 | 0 | 0 | 16 | 0 | 0.07 | 0 | 0 |
| 2-43 | 57 | 17.5 | 7 | 0 | 0 | 18.5 | 0 | 0.1 | 0 | 0 |
| 2-44 | 57 | 17 | 7 | 0 | 0 | 19 | 0 | 0.1 | 0 | 0 |
| 2-45 | 57 | 16.5 | 7 | 0 | 0 | 19.5 | 0 | 0.1 | 0 | 0 |
| 2-46 | 57 | 16 | 7 | 0 | 0 | 20 | 0 | 0.1 | 0 | 0 |
| 2-47 | 57 | 15.5 | 7 | 0 | 0 | 20.5 | 0 | 0.1 | 0 | 0 |
| 2-48 | 57 | 15 | 7 | 0 | 0 | 21 | 0 | 0.1 | 0 | 0 |
| 2-49 | 49 | 15 | 19 | 2 | 0 | 15 | 0 | 0.1 | 0 | 0 |
| 2-50 | 47 | 15 | 21 | 2 | 0 | 15 | 0 | 0.1 | 0 | 0 |
| 2-51 | 45 | 15 | 23 | 2 | 0 | 15 | 0 | 0.1 | 0 | 0 |
| 2-52 | 57 | 16 | 11 | 10 | 0 | 16 | 0 | 0.1 | 0 | 0 |
| 2-53 | 57 | 14.5 | 14 | 0 | 0 | 14.5 | 0 | 0 | 0 | 0 |
| 2-54 | 57 | 15 | 13 | 2 | 0 | 15 | 0 | 0 | 0 | 0 |
| 2-55 | 57 | 14.5 | 14 | 2 | 0 | 14.5 | 0 | 0 | 0 | 0 |
| 2-56 | 57 | 14 | 15 | 2 | 0 | 14 | 0 | 0 | 0 | 0 |
| 2-57 | 57 | 17.5 | 7 | 1 | 0 | 18.5 | 0 | 0.1 | 0 | 0 |
| 2-58 | 57 | 17.5 | 7 | 2 | 0 | 18.5 | 0 | 0.1 | 0 | 0 |
| 2-59 | 57 | 17.5 | 7 | 0 | 0 | 19.5 | 0 | 0.1 | 0 | 0 |
| 2-60 | 57 | 17.5 | 7 | 0 | 0 | 18.5 | 0 | 0.1 | 0 | 3 |
| 2-61 | 57 | 17.5 | 7 | 0 | 0 | 18.5 | 0 | 0.1 | 0 | 6 |
| 2-62 | 53 | 14.5 | 17 | 1 | 0 | 14.5 | 0 | 0.1 | 0 | 0 |
| 2-63 | 51 | 14.75 | 18 | 1.5 | 0 | 14.75 | 0 | 0.1 | 0 | 0 |
| 2-64 | 57 | 18.8 | 5 | 0 | 0 | 18.7 | 0.5 | 0.1 | 0.02 | 0 |
| 2-65 | 57 | 18 | 7 | 10 | 0 | 18 | 0 | 0.1 | 0 | 0 |
| 2-66 | 57 | 17 | 9 | 10 | 0 | 17 | 0 | 0.1 | 0 | 0 |
| 2-67 | 57 | 17.5 | 7 | 4 | 0 | 18.5 | 0 | 0.1 | 0 | 0 |
| 2-68 | 60 | 15.38 | 0 | 0 | 0 | 16.49 | 0 | 0.1 | 0 | 5.15 |

TABLE 4

Properties of Exemplary Clad Glass Compositions

| Sample | Degrad'n Rate (%) | CTE (×10$^{-7}$/° C.) | Liquidus Temp (° C.) | Liquidus Visc (kP) | Strain Pt (° C.) | Anneal Pt (° C.) | Soft Pt (° C.) | Density (g/cm$^3$) |
|---|---|---|---|---|---|---|---|---|
| 2-1 | 22.85 | 92.7 | 1085 | 573 | 612 | 668 | 925 | 2.428 |
| 2-2 | 16.89 | 92.6 | 1035 | 584 | 581 | 633 | 881 | 2.410 |
| 2-3 | 12.55 | 92.6 | 985 | 824 | 557 | 608 | 847 | 2.420 |
| 2-4 | 23.73 | 92.4 | 950 | 898 | 539 | 588 | 813 | 2.401 |
| 2-5 | 28.92 | 92.8 | 900 | >2000 | 522 | 570 | 789 | 2.388 |
| 2-6 | 1.96 | 92.5 | 1030 | 776 | 580 | 634 | 883 | 2.428 |
| 2-7 | 0.94 | 89.8 | 970 | 1326 | 557 | 607 | 849 | 2.427 |
| 2-8 | 13.67 | 84.7 | 1000 | 233 | 541 | 590 | 814 | 2.410 |
| 2-9 | 9.28 | 85.0 | 910 | >2000 | 569 | 624 | 864 | 2.407 |
| 2-10 | 6.76 | 88.0 | 790 | >2000 | 594 | 648 | 899 | 2.385 |
| 2-11 | 6.29 | 79.1 | 775 | >2000 | 524 | 576 | 821 | 2.369 |
| 2-12 | 3.33 | 82.3 | 770 | >2000 | 544 | 596 | 842 | 2.350 |
| 2-13 | 2.13 | 73.0 | 742 | >2000 | 493 | 541 | 779 | 2.330 |
| 2-14 | 2.53 | 74.9 | 760 | >2000 | 508 | 557 | 790 | 2.310 |
| 2-15 | 1.55 | 76.4 | 950 | 1106 | 543 | 591 | 819 | 2.394 |
| 2-16 | 1.94 | 82.1 | 770 | >2000 | 535 | 583 | 814 | 2.394 |
| 2-17 | 2.99 | 85.1 | 750 | >2000 | 526 | 577 | 819 | 2.392 |
| 2-18 | 5.25 | 87.0 | 940 | >2000 | 528 | 578 | 836 | 2.388 |

TABLE 4-continued

Properties of Exemplary Clad Glass Compositions

| Sample | Degrad'n Rate (%) | CTE (×10⁻⁷/ °C.) | Liquidus Temp (° C.) | Liquidus Visc (kP) | Strain Pt (° C.) | Anneal Pt (° C.) | Soft Pt (° C.) | Density (g/cm³) |
|---|---|---|---|---|---|---|---|---|
| 2-19 | 10.31 | 87.7 | 1155 | 68 | 536 | 589 | 849 | 2.384 |
| 2-20 | 5.09 | 87.5 | 770 | >2000 | 516 | 565 | 809 | 2.370 |
| 2-21 | 7.15 | 85.8 | 795 | >2000 | 513 | 561 | 789 | 2.377 |
| 2-22 | 4.59 | 84.6 | 760 | >2000 | 514 | 559 | 772 | 2.382 |
| 2-23 | 5.31 | 79.5 | 750 | >2000 | 526 | 571 | 776 | 2.385 |
| 2-24 | 9.19 | 87.1 | 750 | >2000 | 503 | 552 | 777 | 2.357 |
| 2-25 | 5.73 | 86.3 | 775 | >2000 | 498 | 544 | 760 | 2.366 |
| 2-26 | 3.97 | 84.1 | 770 | >2000 | 502 | 547 | 749 | 2.374 |
| 2-27 | 6.09 | 79.2 | 795 | >2000 | 511 | 554 | 744 | 2.377 |
| 2-28 | 9.89 | 85.4 | 715 | >2000 | 491 | 538 | 760 | 2.348 |
| 2-29 | 10.74 | 86.5 | 735 | >2000 | 487 | 533 | 735 | 2.355 |
| 2-30 | 14.37 | 84.9 | 750 | >2000 | 491 | 534 | 731 | 2.364 |
| 2-31 | 9.73 | 79.4 | 790 | >2000 | 501 | 544 | 726 | 2.368 |
| 2-32 | 5.28 | 81.3 | 765 | >2000 | 521 | 566 | 769 | 2.405 |
| 2-33 | 6.34 | 80.9 | 910 | 294 | 524 | 566 | 753 | 2.435 |
| 2-34 | 12.74 | 88.4 | 1000 | 524 | 555 | 604 | 837 | 2.425 |
| 2-35 | 15.12 | 87.8 | 1000 | 281 | 545 | 591 | 813 | 2.439 |
| 2-36 | 14 | 87.4 | 1030 | 59 | 544 | 589 | 797 | 2.465 |
| 2-37 | 15.76 | 87.1 | 760 | >2000 | 523 | 570 | 800 | 2.385 |
| 2-38 | 17.13 | 88.2 | 750 | >2000 | 521 | 571 | 800 | 2.388 |
| 2-39 | 17.13 | 90.2 | 840 | >2000 | 521 | 570 | 794 | 2.394 |
| 2-40 | 7.86 | 83.6 | 800 | >2000 | 503 | 551 | 785 | 2.365 |
| 2-41 | 7.84 | 83.1 | 770 | >2000 | 495 | 544 | 770 | 2.361 |
| 2-42 | 12.58 | 82.8 | 800 | >2000 | 492 | 540 | 762 | 2.356 |
| 2-43 | 12.28 | 90.8 | 1000 | 773 | 553 | 601 | 841 | 2.428 |
| 2-44 | 12.89 | 91.4 | 990 | 366 | 545 | 592 | 821 | 2.432 |
| 2-45 | 22.9 | 92.7 | 970 | 292 | 534 | 577 | 771 | 2.442 |
| 2-46 | 22.1 | 92.1 | 970 | 149 | 528 | 572 | 766 | 2.450 |
| 2-47 | 24.44 | 94.5 | 960 | 90 | 524 | 564 | 743 | 2.459 |
| 2-48 | 28.93 | 94.5 | 950 | 89 | 519 | 559 | 735 | 2.461 |
| 2-49 | 22.85 | 80.0 | 765 | >2000 | 493 | 533 | 712 | 2.367 |
| 2-50 | 16.21 | 79.3 | 750 | >2000 | 484 | 525 | 702 | 2.355 |
| 2-51 | 16.89 | 80.0 | 775 | 1171 | 476 | 517 | 688 | 2.346 |
| 2-52 | 8.56 | 82.7 | 935 | 66 | 534 | 574 | 736 | 2.495 |
| 2-53 | 2.44 | 79.3 | 735 | >2000 | 508 | 556 | 798 | 2.343 |
| 2-54 | 2.68 | 78.5 | 795 | >2000 | 519 | 561 | 764 | 2.391 |
| 2-55 | 2.9 | 77.1 | 840 | >2000 | 515 | 557 | 744 | 2.382 |
| 2-56 | 2.14 | 75.9 | 765 | >2000 | 510 | 553 | 741 | 2.375 |
| 2-57 | 15.1 | 90.3 | 1010 | 150 | 534 | 579 | 798 | 2.442 |
| 2-58 | 9.66 | 89.6 | 1020 | 85 | 530 | 573 | 784 | 2.452 |
| 2-59 | 16.69 | 93.1 | 1020 | 150 | 532 | 576 | 791 | 2.439 |
| 2-60 | 3.02 | 89 | 800 | >2000 | 530 | 581 | 823 | 2.404 |
| 2-61 | 0.51 | 87.8 | 810 | >2000 | 514 | 564 | 800 | 2.395 |
| 2-62 | 2.84 | 76.7 | 740 | >2000 | 502 | 546 | 763 | 2.348 |
| 2-63 | 4.19 | 78 | 775 | >2000 | 500 | 542 | 737 | 2.355 |
| 2-64 | 15.63 | 94.5 | 970 | 414 | 609 | 664 | 928 | 2.427 |
| 2-65 | 14.96 | 87.5 | 1070 | 10 | 544 | 584 | 762 | 2.513 |
| 2-66 | 13.29 | 83.6 | 990 | 28 | 534 | 573 | 739 | 2.508 |
| 2-67 | 13.1 | 88.9 | 1020 | 42 | 531 | 574 | 764 | 2.473 |
| 2-68 | 0.05 | 84.4 | 990 | >2000 | 630 | 704 | 957 | 2.422 |

As shown in Tables 2 and 4, the exemplary clad glass compositions are less durable (i.e., have higher degradation rates) than the exemplary core glass compositions in the selected reagent (i.e., 50% HCl).

A glass article is formed as described herein and comprises a core formed from an exemplary core glass composition (e.g., Sample 1-1 to 1-4) and a clad formed from an exemplary clad glass composition (e.g., Sample 2-1 to 2-68).

Example 1

A glass article comprising a core formed from the core glass composition of Sample 1-2 and a clad formed from the clad glass composition of Sample 2-13 is formed. The ratio of the degradation rate of the clad glass composition in the selected reagent to the degradation rate of the core glass composition in the selected reagent is about 213. The CTE of the clad glass composition is about $10.6 \times 10^{-7}/°$ C. less than the CTE of the core glass composition.

Figure 9:
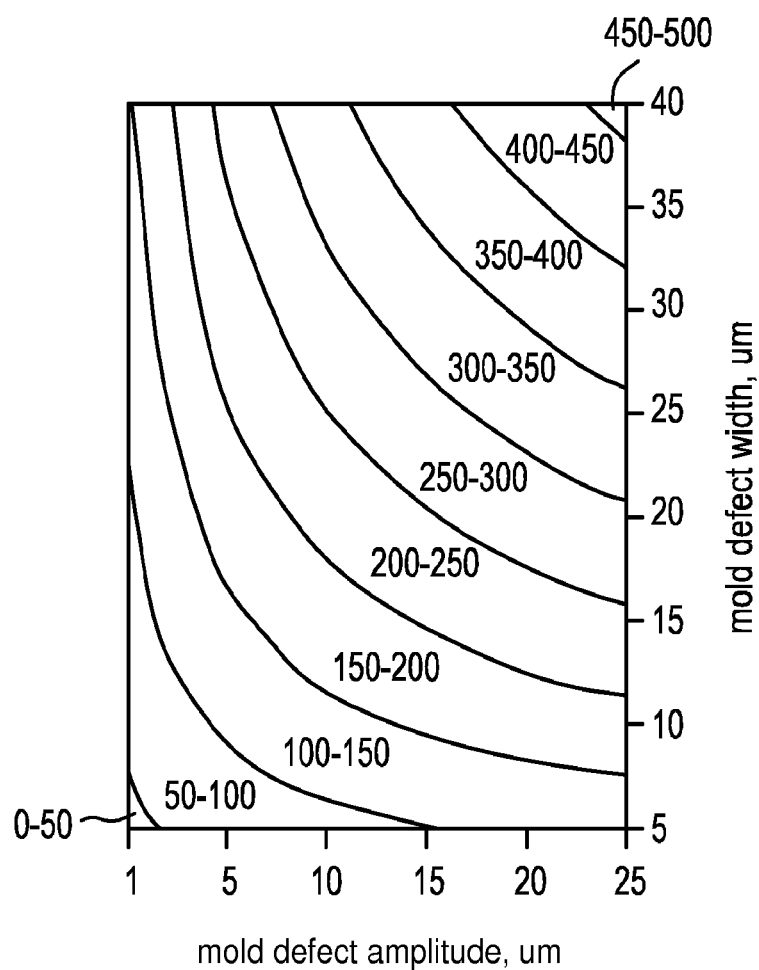
FIG. 9 is a graphical representation of a predicted clad thickness sufficient to avoid a visible defect in a core layer of one exemplary embodiment of a glass article as a function of the amplitude and the width of one exemplary protrusion of a forming surface.

FIG. 9 is a graphical representation of predicted clad thickness sufficient to avoid a visible defect in the core of the glass article as a function of the amplitude and the width of a protrusion on a forming surface. For the purposes of FIG. 9, a visible defect is a defect having a slope of greater than 1/5000. The core to clad viscosity ratio is assumed to be 7.5.

Example 2

A glass article comprising a core formed from the core glass composition of Sample 1-2 and a clad formed from the clad glass composition of Sample 2-49 is formed. The ratio of the degradation rate of the clad glass composition in the selected reagent to the degradation rate of the core glass composition in the selected reagent is about 2285. The CTE of the clad glass composition is about $3.6 \times 10^{-7}/°C$. less than the CTE of the core glass composition.

Example 3

A glass sheet having the general structure shown in FIG. 1 was formed. The core was formed from the core glass composition of Sample 1-2, and the clad was formed from the clad glass composition of Sample 2-13. The glass sheet had a thickness of 1 mm. The ratio of the core layer thickness to the clad layer thickness was about 7.

Figure 10:
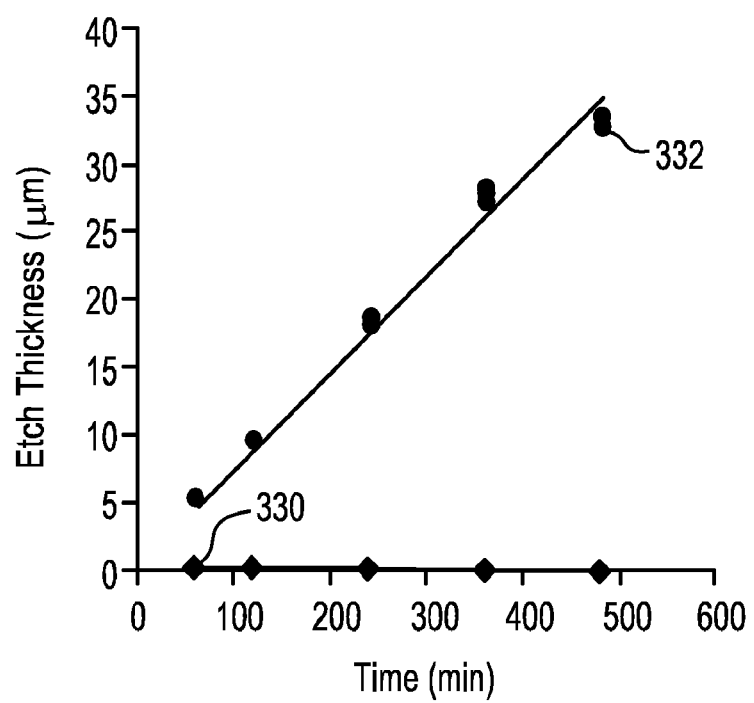
FIG. 10 is a graphical representation of the degradation rates of one exemplary core glass composition and one exemplary clad glass composition, expressed as etch thickness as a function of time.

FIG. 10 is a graphical representation of the degradation rates of each of the core glass composition and the clad glass composition, expressed as etch thickness as a function of time. For the purposes of FIG. 10, etch thickness is the reduction in thickness of the glass sheet in response to exposure of the glass sheet to a static 50 vol % aqueous HCl solution at room temperature. The degradation rate of the core glass composition is represented by diamond-shaped data points 330. The degradation rate of the clad glass composition is represented by circular data points 332. Thus, as shown in FIG. 10, the ratio of the degradation rate of the clad glass composition to the degradation rate of the core glass composition was greater than about 2000.

Figure 11:
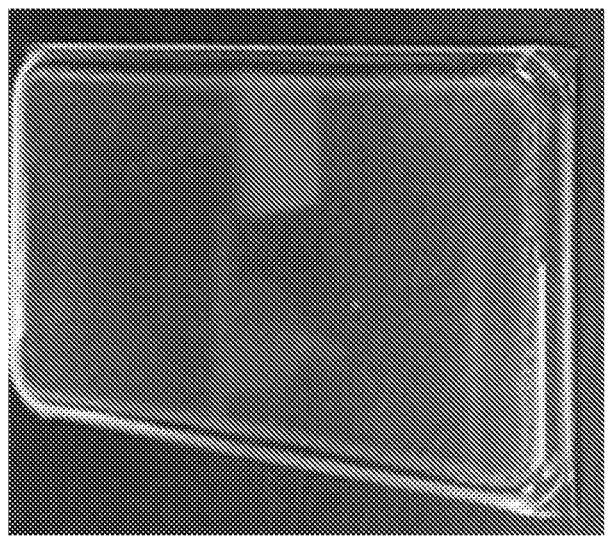
FIG. 11 is a photograph of one exemplary embodiment of a molded glass article prior to removal of the clad.

The glass sheet was formed into a molded glass article using a vacuum mold. FIG. 11 is a photograph of the molded glass article. As shown in FIG. 11, the molded glass article had a dished shape comprising a substantially planar central region encompassed by a curved lip. The molded glass article had a hazy or cloudy appearance. Without wishing to be bound by any theory, it is believed that the haziness is a result of the contact between the clad and the mold.

Figure 12:
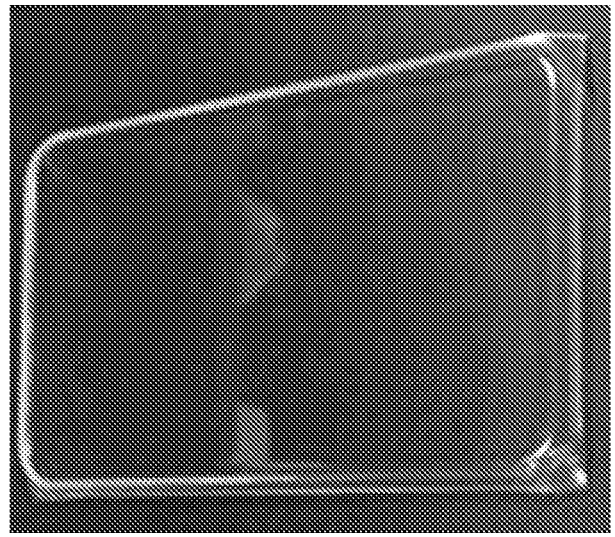
FIG. 12 is a photograph of the molded glass article of FIG. 11 after removal of the clad.

The clad was removed from the molded glass article by exposing the molded glass article to a reagent. FIG. 12 is a photograph of the molded glass article following removal of the clad. The molded glass article had a clear appearance following removal of the clad. In other words, the haziness evident in FIG. 11 does not appear in FIG. 12.

This example demonstrates that it is possible to mold a glass article and then etch the molded glass article to reveal a pristine core surface with little or no polishing following the etching process. Because visible surface damage is removed from the molded glass article during removal of the clad, such a molding and etching process can enable extended mold lifetimes, as more damage can be tolerated from the mold.

Because the core glass composition in this example is ion exchangeable, the molded glass article can be subjected to an ion exchange process following removal of the clad. This can aid in strengthening the molded glass article.

Example 4

A glass sheet having the general structure shown in FIG. 1 was formed as described in Example 3. The glass sheet had a thickness of 2 mm.

Figure 13:
FIG. 13 is a photograph of another exemplary embodiment of a molded glass article following removal of the clad from half of the molded glass article.

The glass sheet was formed into a molded glass article by pressing the glass sheet into a graphite mold with a plunger. The molded glass article had a deep dished shape comprising a substantially planar central region encompassed by a curved lip. The bend between the central region and the lip was near 90°. The clad was removed from about half of the molded glass article by exposing the molded glass article to a reagent. FIG. 13 is a photograph of the molded glass article following removal of the clad from half of the molded glass article. As shown in FIG. 13, the right half of the molded glass article with the clad had a hazy or cloudy appearance, and the left half of the molded glass article without the clad had a clear appearance.

This example further demonstrates that it is possible to mold a glass article and then etch the molded glass article to reveal a pristine core surface with little or no polishing following the etching process, even when the glass article sustains substantial damage during the molding process. Thus, a pristine molded glass article can be formed using a relatively low quality mold.

Example 5

A glass sheet having the general structure shown in FIG. 1 was formed as described in Example 3. The glass sheet had a thickness of 1 mm. The core layer had a thickness of about 0.8 mm. Each of the first and second cladding layers had a thickness of about 0.1 mm.

Figure 14:
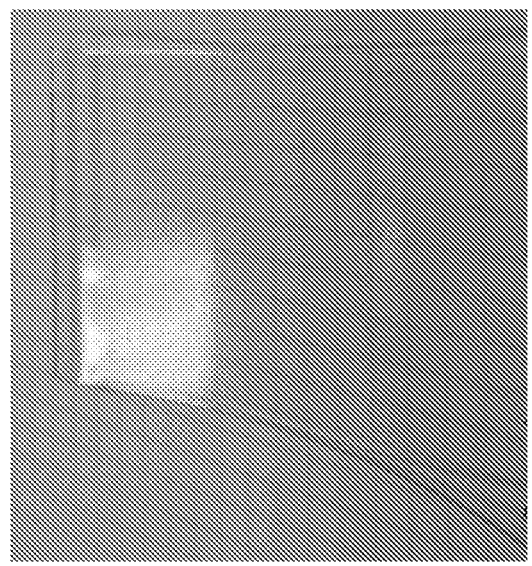
FIG. 14 is a photograph of another exemplary embodiment of a molded glass article prior to removal of the clad.

The glass sheet was formed into molded glass article by sagging the glass sheet onto an outer surface of a cylindrical fused silica substrate. FIG. 14 is a photograph of the molded glass article. As shown in FIG. 14, the molded glass article had a continuous curved shape. The molded glass article had a hazy or cloudy appearance.

Figure 15:
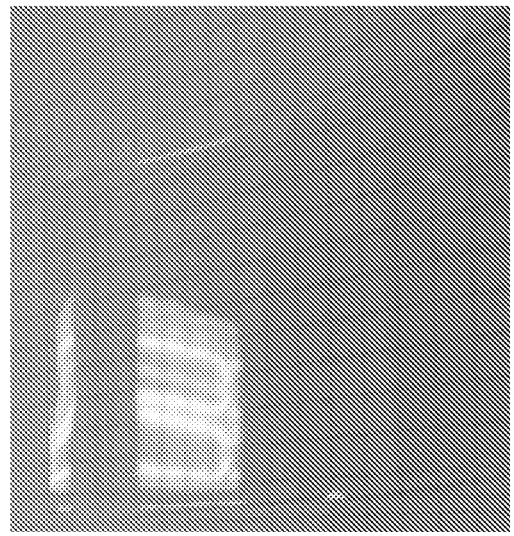
FIG. 15 is a photograph of the molded glass article of FIG. 14 after removal of the clad.

The clad was removed from the molded glass article by exposing the molded glass article to a reagent. FIG. 15 is a photograph of the molded glass article following removal of the clad. The molded glass article had a clear appearance following removal of the clad.

This example further demonstrates that it is possible to mold a glass article and then etch the molded glass article to reveal a pristine core surface with little or no polishing following the etching process.

It will be recognized that each exemplary clad glass composition may not be suitable for use with each exemplary core glass composition to form a glass article within the scope of some of the embodiments described herein. For example, the exemplary clad glass composition of Sample 2-68 has a relatively low degradation rate (e.g., less than 0.9%), and therefore, may not be suitable for use with the each exemplary core glass composition (e.g., Samples 1-1 or 1-2) to form a glass article in which the ratio of the degradation rate of the second glass composition to the degradation rate of the first glass composition is at least 10 as described herein with respect to some embodiments. Also for example, the exemplary clad glass compositions of Samples 2-65 to 2-67 have relatively low liquidus viscosities (e.g., less than 50 kP), and therefore, may not be suitable for forming a glass article using a fusion draw process as described herein with respect to some embodiments.

It will be apparent to those skilled in the art that various modifications and variations can be made without departing from the spirit or scope of the invention. Accordingly, the invention is not to be restricted except in light of the attached claims and their equivalents.

What is claimed is:
1. A method comprising:
   forming a glass article comprising a core and a clad adjacent to the core, the core comprising a core glass composition, the clad comprising a clad glass composition different than the core glass composition;
   wherein the clad glass composition comprises from about 45 mol % to about 60 mol % $SiO_2$, from about 8 mol % to about 19 mol % $Al_2O_3$ and at least one alkali metal oxide selected from the group consisting of $Li_2O$, $Na_2O$, $K_2O$, $Rb_2O$, $Cs_2O$, and combinations thereof;

wherein a degradation rate of the clad glass composition in a reagent is greater than a degradation rate of the core glass composition in the reagent;
wherein the clad glass composition comprises a coefficient of thermal expansion (CTE) of from about $50 \times 10^{-7}/°$ C. to about $95 \times 10^{-7}/°$ C. and a liquidus viscosity of at least about 50 kP.

2. The method of claim 1, wherein the clad glass composition is substantially free of As and Cd; and the degradation rate of the clad glass composition in the reagent is at least 10 times greater than the degradation rate of the core glass composition in the reagent.

3. The method of claim 1, further comprising removing at least a portion of the clad by contacting the glass article with the reagent.

4. The method of claim 1, wherein the glass article comprises a laminated glass sheet, the clad comprises a first cladding layer and a second cladding layer, and the core comprises a core layer disposed between the first cladding layer and the second cladding layer.

5. The method of claim 4, wherein the core layer comprises an inner core layer, a first outer core layer disposed between the first cladding layer and the inner core layer, and a second outer core layer disposed between the second cladding layer and the inner core layer, and wherein each of the first outer core layer and the second outer core layer comprises the core glass composition.

6. The method of claim 5, wherein each of the first cladding layer and the second cladding layer comprises a higher degradation rate in the reagent than each of the first outer core layer and the second outer core layer.

7. The method of claim 4, wherein the core layer comprises an inner core layer, a first outer core layer disposed between the first cladding layer and the inner core layer, and a second outer core layer disposed between the second cladding layer and the inner core layer, each of the first cladding layer, the first outer core layer, the second cladding layer, and the second outer core layer comprises a lower CTE than the inner core layer.

8. The method of claim 1, further comprising contacting the clad of the glass article with a forming surface and subsequently removing at least a portion of the clad by contacting the glass article with the reagent.

9. The method of claim 8, further comprising determining at least one of a clad thickness or a core to clad viscosity ratio based on a surface condition of the forming surface.

10. The method of claim 8, further comprising subjecting the glass article to an ion exchange process subsequent to the removing at least a portion of the clad.

11. The method of claim 1, further comprising causing ion exchange between the core and the clad.

12. A method comprising:
contacting an outer surface of a laminated glass sheet with a glass processing unit, the laminated glass sheet comprising a core layer disposed between a first cladding layer and a second cladding layer, each of the first cladding layer and the second cladding layer independently comprising from about 45 mol % to about 60 mol % $SiO_2$ and from about 8 mol % to about 19 mol % $Al_2O_3$, and at least one alkali metal oxide selected from the group consisting of $Li_2O$, $Na_2O$, $K_2O$, $Rb_2O$, $Cs_2O$, and combinations thereof, each of the first cladding layer and the second cladding layer substantially free of As and Cd; and
contacting the first cladding layer and the second cladding layer with a reagent to at least partially remove the first cladding layer and the second cladding layer, a ratio of a degradation rate of each of the first cladding layer and the second cladding layer in the reagent to a degradation rate of the core layer in the reagent being at least 10.

13. The method of claim 12, wherein the glass processing unit comprises a forming unit, and the contacting the laminated glass sheet with the glass processing unit comprises engaging the laminated glass sheet with a forming surface of the forming unit to form a molded glass article comprising a shape that is complementary to the forming surface.

14. The method of claim 13, wherein the contacting the first cladding layer and the second cladding layer with the reagent comprises removing the first cladding layer and the second cladding layer from the molded glass article.

15. The method of claim 12, wherein the reagent is substantially free of HF.

* * * * *

UNITED STATES PATENT AND TRADEMARK OFFICE
CERTIFICATE OF CORRECTION

Page 1 of 1

PATENT NO. : 10,077,208 B2
APPLICATION NO. : 15/125453
DATED : September 18, 2018
INVENTOR(S) : Alexey Sergeyevich Amosov et al.

It is certified that error appears in the above-identified patent and that said Letters Patent is hereby corrected as shown below:

In the Specification

In Column 1, Line 7, delete "of" and insert -- to --, therefor.

Signed and Sealed this
Fifth Day of January, 2021

Andrei Iancu
*Director of the United States Patent and Trademark Office*